United States Patent
Shimoga et al.

(10) Patent No.: US 11,993,263 B2
(45) Date of Patent: May 28, 2024

(54) HIGH TORQUE BRAKING SYSTEM (71) Applicant: VOLVO CONSTRUCTION EQUIPMENT AB, Eskilstuna (SE)

(72) Inventors: Harisha Shimoga, Bangalore (IN); Natesh Krishnan, Tamilnadu (IN)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 18/139,394

(22) Filed: Apr. 26, 2023

(65) Prior Publication Data

US 2023/0391335 A1 Dec. 7, 2023

(30) Foreign Application Priority Data

Jun. 2, 2022 (EP) .................................... 22176942

(51) Int. Cl.
*B60W 30/18* (2012.01)
*B60T 7/12* (2006.01)
(Continued)

(52) U.S. Cl.
CPC ......... *B60W 30/18109* (2013.01); *B60T 7/12* (2013.01); *B60W 10/10* (2013.01); *B60W 10/18* (2013.01); *B60W 2510/101* (2013.01); *B60W 2510/18* (2013.01); *B60W 2540/16* (2013.01); *B60W 2710/1005* (2013.01); *B60W 2710/18* (2013.01)

(58) Field of Classification Search
CPC .......... B60W 30/18109; B60W 10/10; B60W 10/18; B60W 2510/101; B60W 2510/18; B60W 2540/16; B60W 2710/1005; B60W 2710/19; B60T 7/12; B60T 1/062; B60T 1/093; B60T 10/04; F16H 59/14; F16H 59/68; F16H 59/0217; F16H 2059/3838; F16H 61/4157; F16H 61/431
See application file for complete search history.

(56) References Cited

U.S. PATENT DOCUMENTS

2008/0129109 A1* 6/2008 Schuh ................... F16D 63/006
303/9.61
2009/0029826 A1* 1/2009 Eguchi .................. F16D 48/066
477/39
(Continued)

FOREIGN PATENT DOCUMENTS

CN 213364231 U 6/2021

OTHER PUBLICATIONS

Extended European Search Report, European Application No. 22176942.5, dated Nov. 15, 2022, 9 pages.

*Primary Examiner* — Lori Wu
(74) *Attorney, Agent, or Firm* — Sage Patent Group (57) ABSTRACT

A method of automatically activating a high-torque braking system in a heavy-duty vehicle configured to operate in at least one low speed, high torque mode and at least one higher speed, lower torque mode is disclosed. The method includes determining a speed-controller device such as a joystick or lever of the vehicle is in a first position which results in the vehicle travelling in a higher-speed, lower-torque mode, and, responsive to detecting braking and a change in position of the speed-controller from the first position to a second, neutral, position, activating a low-speed high torque mode of operation for braking the vehicle.

20 Claims, 6 Drawing Sheets (51) Int. Cl.
 *B60W 10/10* (2012.01)
 *B60W 10/18* (2012.01)

(56) References Cited

U.S. PATENT DOCUMENTS

| | | |
|---|---|---|
| 2009/0094976 A1 | 4/2009 | Yatabe |
| 2012/0056470 A1* | 3/2012 | Kim .................... B60W 10/188 |
| | | 303/3 |
| 2014/0378274 A1 | 12/2014 | Umemoto et al. |
| 2015/0176250 A1 | 6/2015 | Stutchbury |
| 2016/0053888 A1* | 2/2016 | Tsuji ................. B60W 30/1884 |
| | | 74/731.1 |
| 2017/0250635 A1 | 8/2017 | Chen et al. |
| 2020/0223435 A1 | 7/2020 | Wolff et al. |
| 2022/0055621 A1 | 2/2022 | Brewer et al. |

* cited by examiner

HIGH TORQUE BRAKING SYSTEM

CROSS REFERENCE TO RELATED APPLICATIONS

This application claims priority to European Patent Application No. 22176942.5, filed on Jun. 2, 2022, the disclosures and content of which are incorporated by reference herein in its entirety.

TECHNICAL FIELD

The present disclosure relates to a method of automatically activating a high-torque braking system in a vehicle and to various related aspects.

In particular, but not exclusively the disclosed technology relates to a method of automatically activating a high-torque braking system in a vehicle configured to operate using a forward and reverse directional speed selection lever in either a low speed high torque mode of propulsion or in a high speed low torque mode of propulsion.

This is particularly useful for heavy-duty vehicles which use hydrostatic transmission such as Pneumatic tire roller, compactors which may operate in construction sites and other types of industrial settings.

BACKGROUND

Various types of vehicles, including off-highway vehicles and heavy-duty vehicles, use hydrostatic transmission with 2 speed options, one being high speed low torque mode and other is low speed high torque mode. Various standards impost braking distance criteria which such vehicles must bee, for example, the ISO new 3450 standard. Construction site and similar settings may see a vehicle of a 10.5 ton or 13 Ton carrying loads which increase their weight to 24 Ton. Currently, the braking systems of such vehicles may not meet the new ISO3450 for the max speed and max weight when the vehicle is operating in a high speed and low torque propulsion mode.

United States Patent Application 2014/378274 discloses a speed change system for a work vehicle having a continuously variable transmission device. The speed change system selects a first change gear ratio which is set larger than a smallest change gear ratio when an engine rotational speed is a first set rotational speed which is set equal or close to an idling rotational speed of an engine. The change gear ratio of the continuously variable transmission device is retained at the smallest change gear ratio when the engine rotational speed is equal to or above a second set rotational speed set on a high-speed side relative to the first set rotational speed. The change gear ratio of the continuously variable transmission device is made larger between the first change gear ratio and the smallest change gear ratio as the engine rotational speed at that moment becomes lower when the engine rotational speed is between the first and second set rotational speeds.

United States Patent Application 2009/094976 discloses a hydraulic motor being switched to a high-speed mode when pressure oil is supplied to a pressure chamber of a tilt piston based on the transmission of a speed signal to a high-low speed switching valve. The hydraulic motor is switched to a low-speed mode when pressure oil is discharged from the pressure chamber of the tilt piston. A first braking purpose speed changing mechanism operates so as to discharge pressure oil from the pressure chamber of the tilt piston when the pressure of pressure oil between a counterbalance valve and a direction changeover valve becomes equal to a tank pressure. A variable hydraulic motor driving device is provided which is capable of preventing braking operation from being excessively long and also capable of preventing a large shock from occurring at a time of stoppage due to a large braking force generated from an early stage of braking operation.

United States Patent Application 2020/223435 discloses a vehicle control system which determines an upper non-zero limit on deceleration of a vehicle to prevent rollback of the vehicle down a grade being travelled up on by the vehicle. The upper non-zero limit on deceleration is determined by the controller based on a payload carried by the vehicle, a speed of the vehicle, and a grade of a route being travelled upon by the vehicle. The controller is configured to monitor the deceleration of the vehicle, and to automatically prevent the deceleration of the vehicle from exceeding the upper non-zero limit by controlling one or more of a brake or a motor of the vehicle. The controller also is configured to one or more of actuate the brake or supply current to the motor of the vehicle to prevent rollback of the vehicle while the vehicle is moving up the grade at a non-zero speed.

United States Patent Application 2015/176250 discloses a load-haul-dump (LHD) vehicle for constrained spaces such as underground mines. The LHD includes a front axle and a rear axle, and an articulation in the vehicle between the front and rear axles. A diesel engine is positioned to the rear of the rear axle, and powers a hydraulic pump. A hydraulic motor is positioned forwardly of the articulation, and is hydraulically driven by the hydraulic pump. A transmission is driven by the hydraulic motor, and drives the front axle and rear axle via respective drive shafts.

The disclosed technology seeks to mitigate, obviate, alleviate, or eliminate various issues known in the art which affect the braking distance and braking time of vehicles, such as, for example, those mentioned above.

SUMMARY

Whilst the scope of the present disclosure is defined by the accompanying claims, various aspects of the disclosed technology including the claimed technology are set out in this summary section with examples of some preferred embodiments and indications of possible technical benefits.

Embodiments of the disclosed technology seek to improve vehicle braking. In particular, braking of heavy-duty vehicles, such as off-highway vehicles, which may have 2-speed modes and hydrostatic transmission systems. One speed mode provides high-speeds at low-torque and the other speed mode provides low-speeds at high-torque. In particular, vehicles which may not currently be configured to brake in compliance with the latest standards can be configured to implement a method of braking according to the disclosed technology.

A first aspect of the disclosed technology relates to a method of automatically activating a high-torque braking system in a vehicle, for example, a heavy-duty vehicle, configured to operate in at least one low speed, high torque propulsion mode and at least one higher speed, lower torque propulsion mode, the method comprising determining a speed-controller lever, or similar device, of the vehicle is in a first position which results in the vehicle travelling in a higher-speed, lower-torque propulsion mode; and, responsive to detecting braking and a change in position of the speed-controller lever, for example, the device, from the first position to a second, neutral, position, activating a low-speed high torque propulsion mode to enhance braking of the vehicle.

Advantageously, in some embodiments the method can be performed without needing to add any new brake system hardware or components. Instead, a braking distance which is standards compliant may be achieved by activating a new operating mode using existing hardware and control components for the vehicles propulsion system using software.

Another benefit is that the braking is implemented without requiring an operator to have first switched from a low-torque/high-speed propulsion mode to a high-torque/low-speed propulsion mode. Instead, the vehicle starts in high-speed/low-torque mode and changes to the low-speed/high-torque mode while braking without an operator noticing the shift as it is achieved using software and ECU logic. This may enable quicker and more responsive braking by the vehicle in the event it needs to brake suddenly.

The vehicle may be a heavy-duty vehicle or other type of vehicle which is remotely operated in some embodiments, in which case the speed controller signals may be communicated wirelessly to the control system for the vehicle.

In some embodiments, the speed-controller lever is a device such as a joystick or FSR lever. In other words, the speed-controller lever comprises a joystick or a FSR lever in some embodiments.

Advantageously, the method can be implemented whilst the vehicle is being operating with either forward directional movement or when it is being operated in a reversing direction as the high-torque mode will be always activated when the speed controller, for example, a speed selection directional lever such as a FSR level or joystick is in neutral. Out of neutral, the same lever can be operated to switch the vehicles speed from high-speed or low-speed and vice versa.

In some embodiments, the inputs from the speed-controller lever control the propulsion system of the vehicle to activate the high-torque braking propulsion mode depending on one or more high-torque braking conditions being met.

In some embodiments, the change is position of the speed controller lever comprises moving the speed-controller lever from the first position, wherein the first position comprises a full forward position, to the second position, wherein the second position is obtained by moving the speed-controller lever back into the neutral position.

In some embodiments, the vehicle beings to brake in the high-speed low torque propulsion mode and dynamically shifts to the low-speed high-torque propulsion mode during braking responsive to the change in position of the speed-controller lever from forward in the first position into neutral in the second position.

In some embodiments, the vehicle comprises an electronic control unit, ECU, which is configured, responsive to the detected movement of the speed-controller, to cause a 2-speed solenoid of a propulsion system of the vehicle to change the torque mode of the propulsion system of the vehicle from the high speed low torque propulsion mode to the low-speed high torque propulsion mode to brake the vehicle without requiring an operator to manually switch the vehicle from the high-speed low torque propulsion mode to the low-speed high-torque propulsion mode.

In some embodiments, a time-delay is provided between detecting the movement triggering the high-torque braking and causing the propulsion system to operating in the high-torque braking propulsion mode.

A second aspect of the disclosed technology comprises a control system configured to automatically activate a high-torque braking system in a heavy-duty vehicle configured to operate in at least one low speed, high torque mode and at least one higher speed, lower torque mode, wherein the control system comprises memory, one or more processors or processing circuitry and a speed-controller lever position detector configured to detect a position of a speed-controller lever of the vehicle, any changes in position of the speed-controller, and if the vehicle is operating in a high-speed low torque mode of propulsion, the system also comprises a braking detector configured to detect braking of the vehicle and a low-speed high-torque activator configured to activating a low-speed high torque mode of propulsion for assisting braking of the vehicle responsive to the controller determining the propulsion system of the vehicle is operating in a high-speed, low-torque mode and the speed-controller lever position detector detecting a change in position of the speed-controller from the first position to a neutral position.

In some embodiments, the control system comprises computer-program code which, when loaded from memory and executed by the one or more processors, configures the speed-controller lever position detector, the braking detector, and the low-speed high-torque activator to cause the control system to implement a method according to the method aspect or any one of its embodiments disclosed herein.

A third aspect of the disclosed technology relates to a heavy-duty vehicle comprising a control system according to the control system aspect or any one of its embodiments disclosed herein.

In some embodiments, the heavy-duty vehicle comprises a control unit configured to automatically activate a high-torque braking system in a heavy-duty vehicle configured to operate in at least one low speed, high torque mode and at least one higher speed, lower torque mode, where the control system comprises memory, one or more processors or processing circuitry a speed-controller position detector configured to detect a position of a speed-controller lever of the vehicle, any changes in position of the speed-controller lever, and if the vehicle is operating in a high-speed low torque mode of propulsion, a braking detector configured to detect braking of the vehicle, and a low-speed high-torque activator configured to activating a low-speed high torque mode of propulsion for assisting braking of the vehicle responsive to the controller determining the propulsion system of the vehicle is operating in a high-speed, low-torque mode and the speed-controller position detector detecting a change in position of the speed-controller from the first position to a neutral position.

In some embodiments of the heavy duty vehicle the control system comprises computer-program code which, when loaded from memory and executed by the one or more processors, configures the speed-controller lever position detector, the braking detector, and the low-speed high-torque activator.

In some embodiments, the heavy duty vehicle is capable of being operated semi-autonomously or remotely.

A fourth aspect of the disclosed technology relates to a computer program product comprising computer-code which when loaded from memory and executed by one or more processors of a control system of a vehicle having an automated driving system according to the second aspect or any one of its embodiments disclosed herein, cause the vehicle to implement a method according to the first, method, aspect or any one of its embodiments disclosed herein.

Another aspect of the disclosed technology comprises a computer-readable storage medium comprising computer-program code which, when executed by one or more processors or processing circuitry of an apparatus, causes the apparatus to implement a method according to the first aspect or any one of its embodiments disclosed herein.

Another aspect of the disclosed technology comprises a computer program carrier carrying a computer program comprising computer-program code, which, when loaded from the computer program carrier and executed by one or more processors or processing circuitry of an apparatus causes the apparatus to implement a method according to the first aspect or any one of its embodiments disclosed herein, wherein the computer program carrier is one of an electronic signal, optical signal, radio signal or computer-readable storage medium.

Another aspect of the disclosed technology comprises a computer program product comprising computer-code which when loaded from memory and executed by one or more processors of a control circuit of a vehicle having an automated driving system, causes the vehicle to implement a method according to the first aspect or any one of the method's embodiments disclosed herein.

Another aspect of the disclosed technology comprises a computer program product comprising instructions to cause the control system of the second aspect or any one of its embodiments disclosed herein to execute a method according to the first aspect or any one of its embodiment disclosed herein, in other words to at least execute a method of automatically activating a high-torque braking system in a vehicle configured to operate in at least one low speed, high torque propulsion mode and at least one higher speed, lower torque propulsion mode, the method comprising: determining a speed-controller lever of the vehicle is in a first position which results in the vehicle travelling in a higher-speed, lower-torque propulsion mode; and, responsive to detecting braking and a change in position of the speed-controller lever from the first position to a second, neutral, position, activating a low-speed high torque propulsion mode to enhance braking of the vehicle.

Another aspect of the disclosed technology comprises a non-transitory computer-readable storage medium comprising instructions, which when executed by the processing circuitry, cause processing circuitry of the control system of the second aspect or any one of its embodiments disclosed herein to perform a method according to the first aspect or any one of the embodiments of the method disclosed herein. That is to say at least to cause the processing circuitry of the control system to perform a method of automatically activating a high-torque braking system in a vehicle configured to operate in at least one low speed, high torque propulsion mode and at least one higher speed, lower torque propulsion mode, the method comprising: determining a speed-controller lever of the vehicle is in a first position which results in the vehicle travelling in a higher-speed, lower-torque propulsion mode, and, responsive to detecting braking and a change in position of the speed-controller lever from the first position to a second, neutral, position, activating a low-speed high torque propulsion mode to enhance braking of the vehicle.

The disclosed aspects and embodiments may be combined with each other in any suitable manner which would be apparent to someone of ordinary skill in the art. Reference to any one of the embodiments may refer to more than one embodiment when appropriate as would be apparent to anyone of ordinary skill in the art.

BRIEF DESCRIPTION OF THE DRAWINGS

Some embodiments of the disclosed technology are described below with reference to the accompanying drawings which are by way of example only and in which.

DETAILED DESCRIPTION

Aspects of the present disclosure will be described more fully hereinafter with reference to the accompanying drawings. The apparatus and method disclosed herein can, however, be realized in many different forms and should not be construed as being limited to the aspects set forth herein. Steps, whether explicitly referred to a such or if implicit, may be re-ordered or omitted if not essential to some of the disclosed embodiments. Like numbers in the drawings refer to like elements throughout.

The terminology used herein is for the purpose of describing particular aspects of the disclosure only, and is not intended to limit the disclosed technology embodiments described herein. As used herein, the singular forms "a", "an" and "the" are intended to include the plural forms as well, unless the context clearly indicates otherwise.

Figure 1:
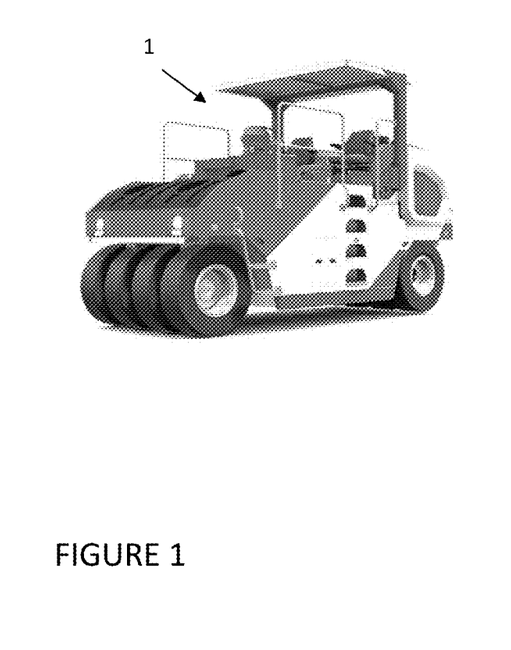
FIG. 1 schematically illustrates an example of a vehicle which may be braked using an embodiment of the disclosed technology.

FIG. 1 schematically illustrates an example of a vehicle which may be braked using an embodiment of the disclosed technology. In FIG. 1 of the drawings, an embodiment of vehicle 1 comprises a heavy-duty vehicle in the form of a truck.

Figure 2A:
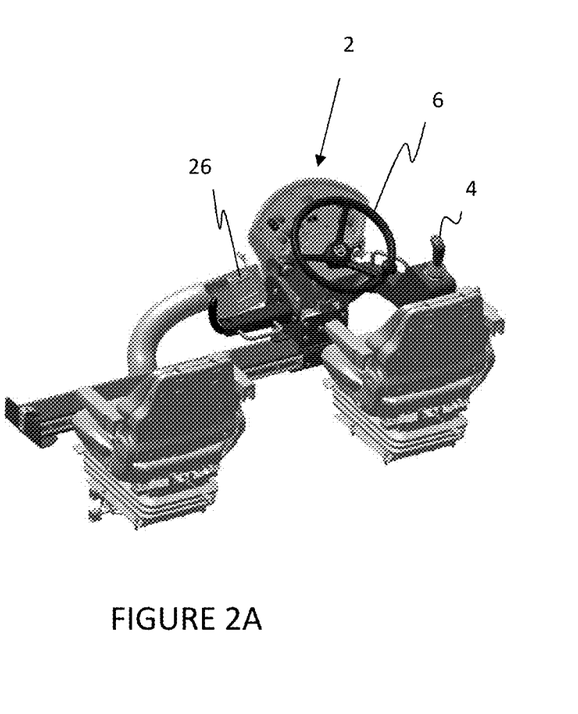
FIG. 2A schematically illustrates an operator area within the vehicle according to some embodiments of the disclosed technology.

FIG. 2A schematically illustrates an operator area within the vehicle 1 according to some embodiments of the disclosed technology. In FIG. 2A, an example view of the interior of a heavy-duty vehicle 1 such as that shown in FIG. 1 is shown schematically.

In FIG. 2A, a speed-controller level 4 is moved into various forwards and reverse positions to select the speed of a vehicle. In some embodiments, the speed-controller lever comprises a forward/reverse lever or a joy-stick. As shown in FIG. 2A, the speed-controller 4 is located to one-side of a steering wheel 6, behind which is located dashboard 2. A separate steering wheel 6 provides directional control over the direction the vehicle drives in. A user interface, or human-machine interface, HMI, 26 is also shown in FIG. 2. It will also be apparent to anyone of ordinary skill in the art that the interior of the vehicle 1 also includes one or more braking actuators such as pedals, buttons, levers for activating one or more braking systems and/or for selecting a propulsion mode of the vehicle, for example, two-speed solenoid or switch 24 is provided in some embodiments which an operator can actuate to toggle between a high-torque low speed propulsion mode and a low-speed high-torque propulsion mode.

In some embodiments, a high speed/low torque propulsion mode switch is selected. In order to cause the vehicle to operate at high-speeds, a park brake of the vehicle's braking system (not shown in FIG. 2) is released and the speed-controller joystick position is fully forward. Whenever the speed-controller joystick is brought back to neutral from being fully forwards to brake the vehicle, the vehicle's ECU 22 provides a control signal as output OUT3 (see FIG. 5) to a two speed solenoid which changes the propulsion mode from a high-speed low torque propulsion mode to a low-speed high torque propulsion mode to brake the vehicle more efficiently.

In some embodiments, the time-delay between the movement of the speed-controller or joystick and the activation of the solenoid is configurable which may allow for a better operator feel while braking. In other words, the time delay may be adjusted to allow for a slightly smoother braking experience in some embodiments.

Figure 2B:
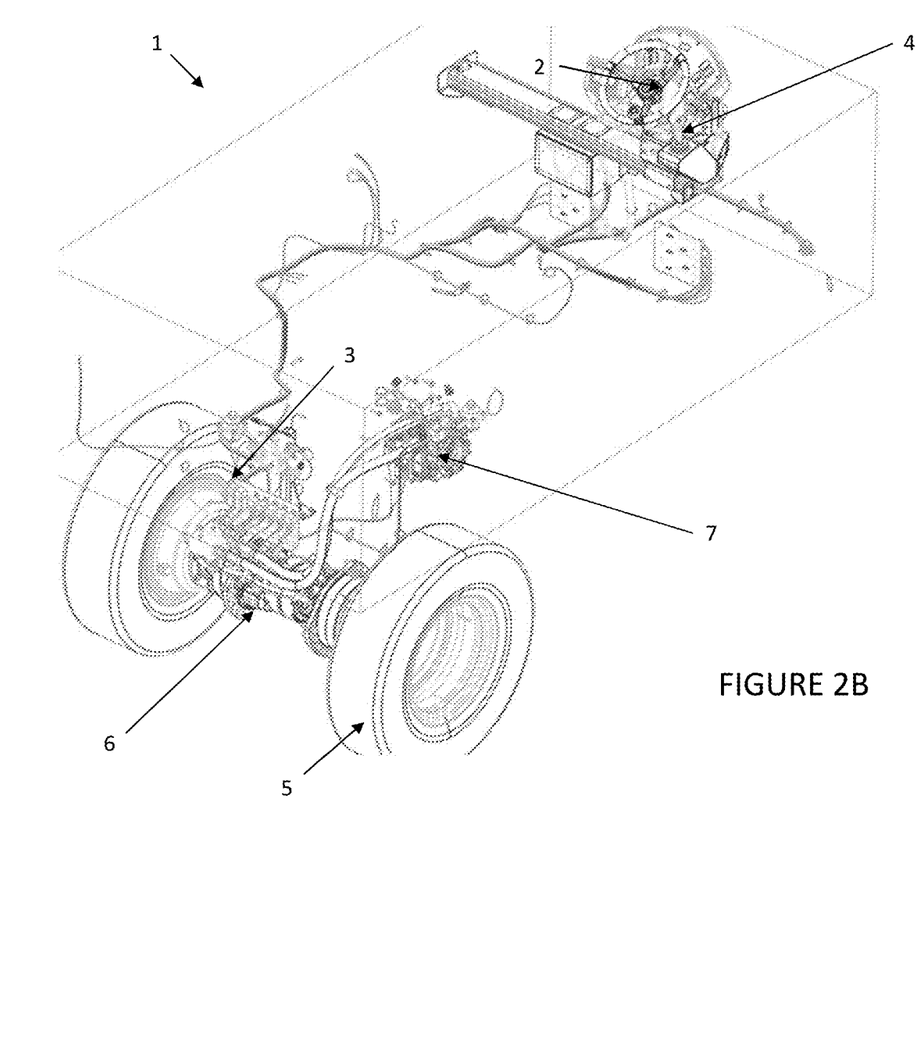
FIG. 2B schematically illustrates various vehicle system components of the vehicle used for braking the vehicle according to some embodiments of the disclosed technology.

FIG. 2B schematically illustrates another view of vehicle 1 showing various vehicle system components of the vehicle used for braking the vehicle according to some embodiments of the disclosed technology. As shown in FIG. 2B, the vehicle or machine 1, comprises a propulsion electronic control system 2, a two-speed solenoid 3, a joy-stick 4, a set of rear tyres 5, a rear drive motor 6, and propulsion pump solenoids 7.

Although the embodiment of FIG. 2B shows a rear-wheel drive vehicle, it will be apparent to anyone of ordinary skill in the art that the disclosure technology may be adapted for front, four-wheel or all-wheel drive vehicles.

Figure 3:
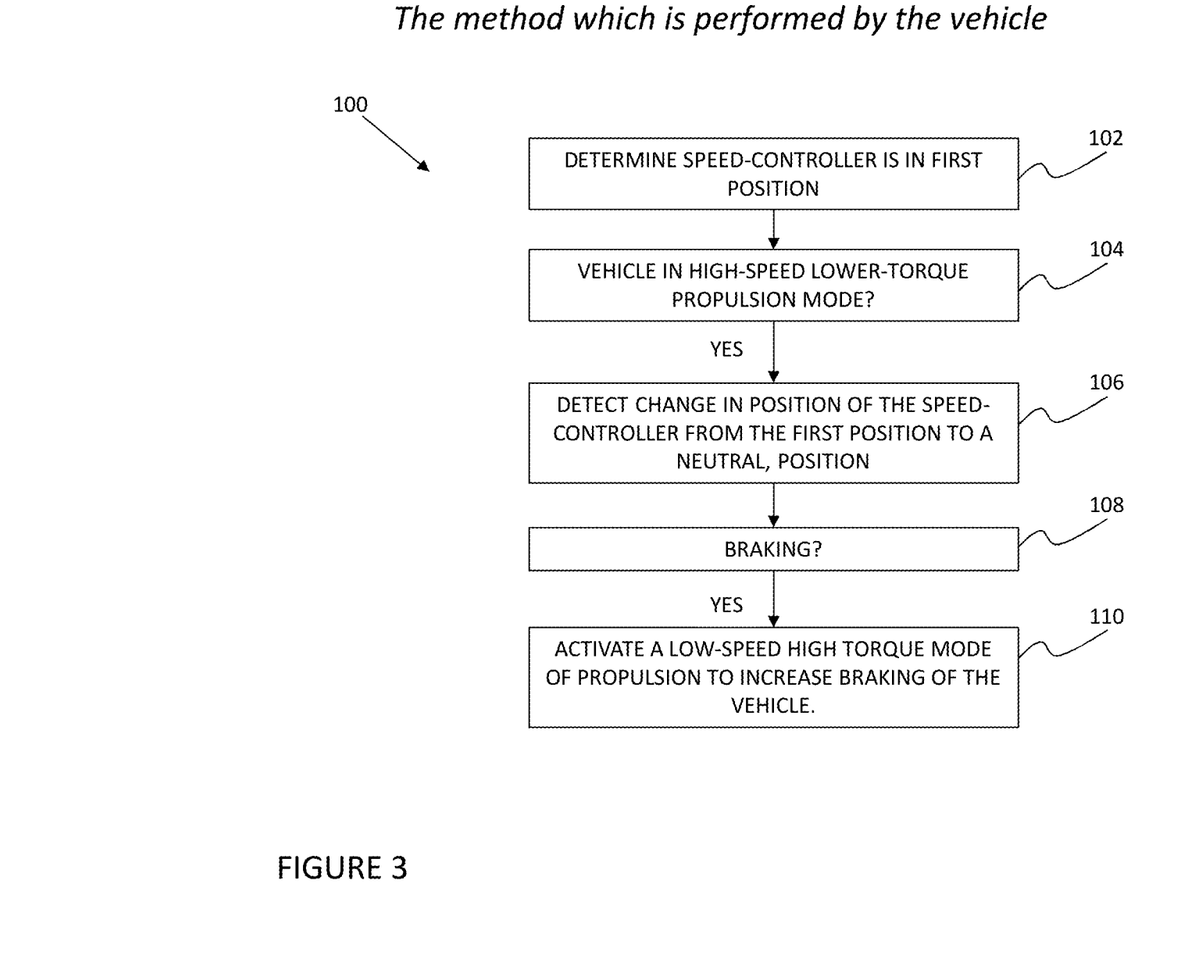
FIG. 3 schematically illustrates a method according to some embodiments of the disclosed technology.

FIG. 3 shows a method according to some embodiments of the disclosed technology which the vehicle 1, or more specifically the propulsion electronic control system 2 performs to brake the vehicle when it is moving in a high-speed low-torque mode.

FIG. 3 of the drawings shows an example embodiment of a method 100 in which a vehicle 1 is configured to perform according to the disclosed technology. In FIG. 3, method 100 comprises determining if a speed controller is in a first position 102 in which allows the vehicle to operate in a high-speed lower-torque mode. If, at a time when the vehicle is determined to be in the high-speed lower-torque mode in 104, a change of the speed-controller is detected from the first position to a second, neutral position in 106, and concurrently braking is detected in 108, the vehicle is configured to activate a low-speed high torque mode of operation which enhances the braking of the vehicle in 110.

Some embodiments of the method 100 comprise a method of automatically activating a high-torque braking system in a vehicle configured to operate in at least one low speed, high torque propulsion mode and at least one higher speed, lower torque propulsion mode. The method 100 comprises determining a speed-controller lever 4 of the vehicle 1 is in a first position which results in the vehicle travelling in a higher-speed, lower-torque propulsion mode, and, responsive to detecting braking and a change in position of the speed-controller lever 4 from the first position to a second, neutral, position, activating a low-speed high torque propulsion mode to enhance braking of the vehicle 1. The method may use a speed-controller lever which is a joystick or forward speed reverse, FSR, lever.

In some embodiments of the method, inputs from the speed-controller lever control the propulsion system of the vehicle to activate the high-torque braking propulsion mode depending on one or more high-torque braking conditions being met. The speed controller inputs may be analog inputs or digital inputs. In some embodiments, analog inputs from the speed controller determine the vehicle's speed and digital inputs from the speed controller determine the direction of travel of the vehicle.

The speed controller lever can change position by moving the speed-controller lever from a first position which is a full forward position, which generates a high speed, to a neutral position. The second position, the neutral position, may be obtained by moving the speed-controller lever backwards.

In some embodiments, when the vehicle beings to brake in the high-speed low torque propulsion mode it dynamically shifts to the low-speed high-torque propulsion mode during braking if such a change in position of the speed-controller lever from forward in the first position into neutral in the second position is detected.

The vehicle 1 comprises an electronic control unit, ECU, for example, a propulsion ECU 2, in some embodiments which is configured, responsive to the detected movement of the speed-controller 4, to cause a 2-speed solenoid 3 of a propulsion system of the vehicle 1 to change the torque mode of the propulsion system of the vehicle 1 from the high speed low torque propulsion mode to the low-speed high torque propulsion mode. This allows the vehicle to brake without requiring an operator to manually switch the vehicle from the high-speed low torque propulsion mode to the low-speed high-torque propulsion mode.

In some embodiments, the method further comprises providing a time-delay between detecting the movement triggering the high-torque braking and causing the propulsion system to operating in the high-torque braking propulsion mode.

Figure 4:
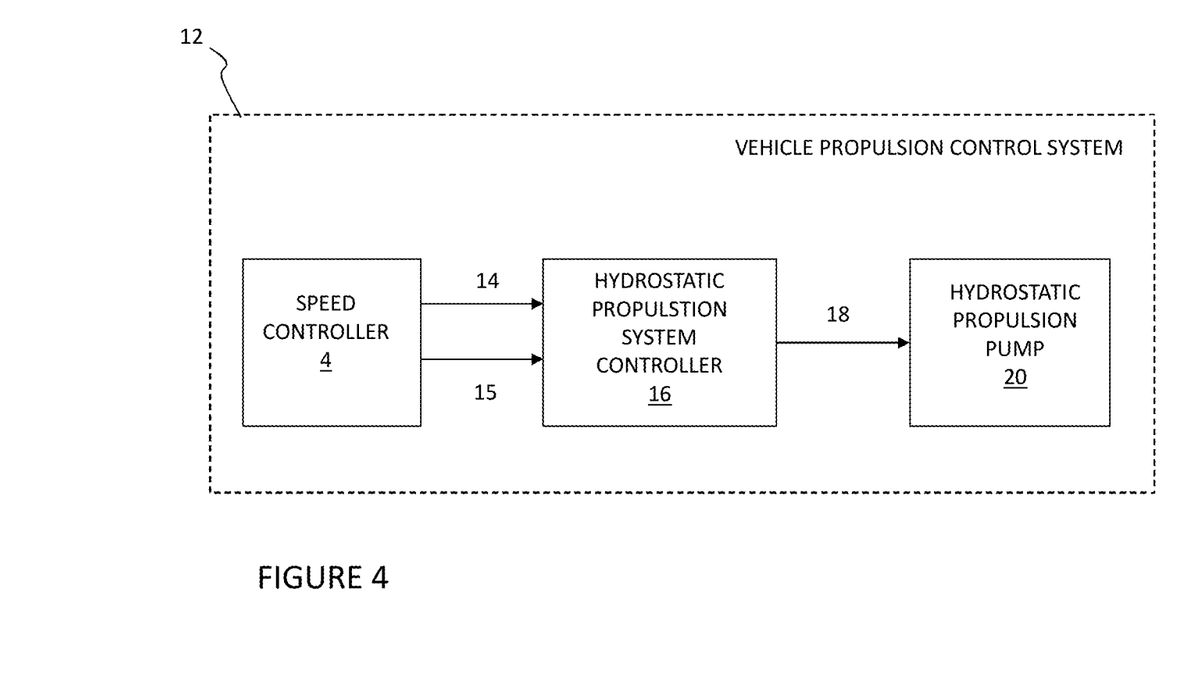
FIG. 4 shows schematically a vehicle propulsion control system according to some embodiments of the disclosed technology.

FIG. 4 shows schematically an embodiment of the propulsion electronic control system 2 of FIG. 2B comprising vehicle propulsion control system 12 according to some embodiments of the disclosed technology. As shown in the embodiment of the vehicle propulsion control system 12 of FIG. 4, moving the speed controller 4 from one position to another position generates a vehicle dynamic control, VDC, analog speed signal 14 and a directional, digital signal 15. The analog signal 14 from the speed controller 4 is used by the propulsion controller 16 for varying the machine speed proportionally from 0 to a maximum speed. The digital signal 15 from the speed controller 4 may be used as reference signal for identifying the machine travel direction or for indicating the machine is travelling in neutral (in other words to provide a Forward/Neutral/Reverse input) as redundancy when making a vehicle or machine braking decision. The speed controller's analog and digital inputs are verified in software and the neutral position is treated as a priority when braking for safety considerations. In this way, if one signal fails, the machine should still brake with the other signal neutral as a priority for safety (machine stop).

The controller 16 for the vehicle's propulsion system is shown as hydrostatic propulsion system controller 16 in FIG. 4. The controller 16 generates a suitable current signal 18 to control the propulsion system, for example, a pulse-wave modulated, PWM, current signal 18 may be used in some embodiments. The use of a PWM current for effective and precise control of vehicle movement is well known. The control signal 18 controls the vehicle's propulsion pump 20, which may comprise, as illustrated in the example embodiment of FIG. 4, a hydrostatic propulsion pump 20.

In some embodiments, the hydrostatic propulsions system is a DANFOSS controller and the pump is a DANFOSS propulsion pump. It will be apparent to anyone of ordinary skill in the art that alternative propulsion systems may be used in some embodiments which are capable of switching rapidly between at least two levels of torque.

Figure 5:
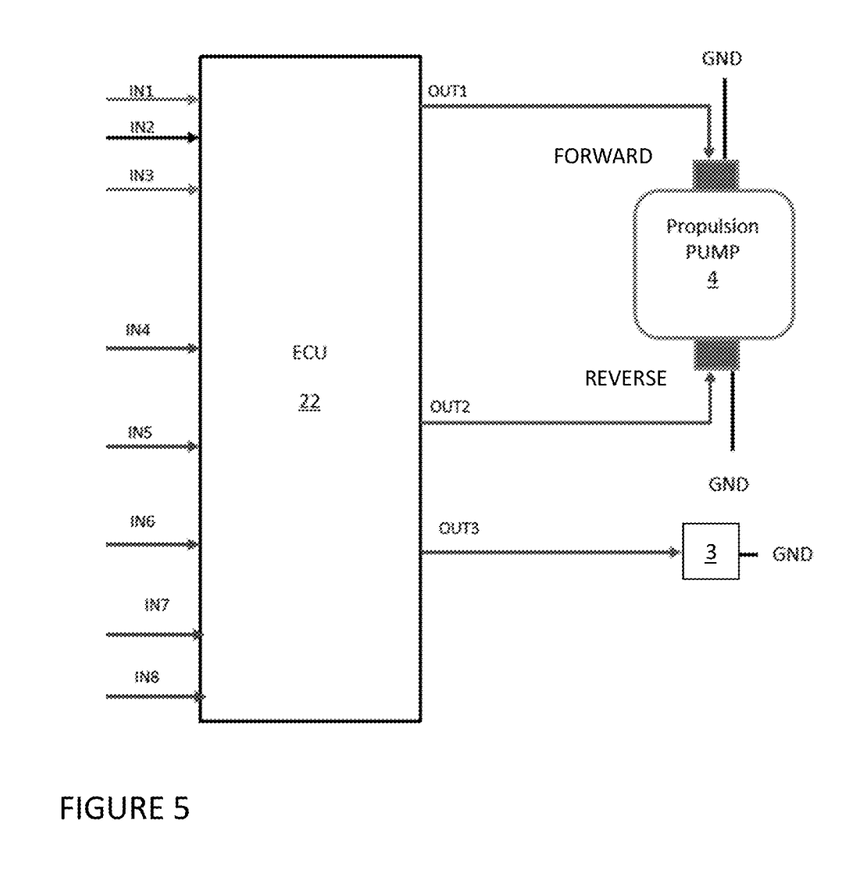
FIG. 5 shows schematically a wiring diagram for the vehicle control system according to some embodiments of the disclosed technology.

FIG. 5 shows schematically a wiring diagram for the vehicle control system according to some embodiments of the disclosed technology in which the vehicles ECU 22 may be configured to implement the vehicle propulsion control system 12 as shown in FIG. 12. FIG. 5 shows schematically an example block diagram of a propulsion control system 12 according to an embodiment of the disclosed technology. In FIG. 5, multiple inputs IN1 . . . IN8 are provided to the vehicle's electronic control unit, ECU, 22. The inputs include but are not necessarily limited to, an ignition input, for example, an ignition key on input IN1 as shown in FIG. 5, a ground input IN2, an engine on input IN3, for example an engine ON signal from the vehicle's EMS. Also shown in FIG. 5 is a speed selector input IN4, for example, a forward, neutral, revers, FNR, joystick 4 may be used to provide inputs 14 and 15 as shown in FIG. 4. In FIG. 5, the inputs comprise an analog speed input signal IN4, and a two-speed selection input IN5.

As shown in FIG. 5, separate signals, for example, digital signals 15 may be used to indicate if the speed selector, in other words the FNR joystick is driving the vehicle in a neutral, forwards, or reverse direction. For example, as shown in FIG. 5, the speed controller neutral input is IN6, the speed-controller reverse input is IN7, and the speed controller forward input IN8. Based on the input signals, ECU 22 generates a number of control signals 18 which are output to control various components of the propulsion system of the vehicle 1. For example, OUT1 controls the propulsion pump 4 to move the vehicle in a forwards direction. The ECU's OUT2 signal controls the propulsion pump 4 to move the vehicle 1 in a reverse direction. Each signal output by the ECU 22 comprises a pulse-wave modulated signal which is sent to the propulsion pump 4 in some embodiments.

Also shown in FIG. 5 is the other output OUT 3 from the ECU 22 which comprises a digital output signal sent to the two-speed solenoid 3 (see also, for example, FIG. 2B). Various other outputs may also be provided by the ECU 22. The OUT1 and OUT2 are both fed into the propulsion pump 4, for example, an H1P series pump, as the vehicle 1 can travel in both forward or reverse directions so that braking has to work in both directions. In a vehicle with a hydrostatic propulsion system 4 such as that shown in the schematic diagram of FIG. 5, the two-speed solenoids, for example, the A & B solenoids, of the pump 4 control the forward or reverse so that output OUT1 AND OUT2 in both direction can be taken into account when braking according to the disclosed embodiments of the invention. In some embodiments, additional outputs may be provided, for example, another reversing output and a CAN output may be used to provide data to a user interface, or human machine interface, shown as HMI 26 in FIG. 2A. The HMI 26 may be provided in some embodiments on a touch-screen display or the like of the vehicle's dashboard or cockpit.

The speed-controller lever, or joystick, 4 signal is provided to the two-speed solenoid 24 via the ECU 22. When the speed controller lever 4 moves from a first position which causes the vehicle to use a higher-speed, lower-torque propulsion mode to a second, neutral, position, if the ECU detects a braking system of the vehicle has been activated, it will generate a signal that activates the two-speed solenoid 24 to switch the propulsion system 16 of the vehicle 1 to operate in a low-speed high torque mode which enhances the braking of the vehicle, and allows the vehicle to stop more quickly in a shorter distance.

In some embodiments of the propulsion system which comprises a joystick speed-controller or selector, all inputs from the joystick goes to the ECU 22 and the ECU 22 provides output for the propulsion solenoids and the 2-speed solenoid, after checking for the conditions defined in a truth table. The speed selection change happens only when the Joystick is in Neutral and when the machine is in movement and speed is changed, applied change will happen only after the Joystick is brought to Neutral.

Figure 6:
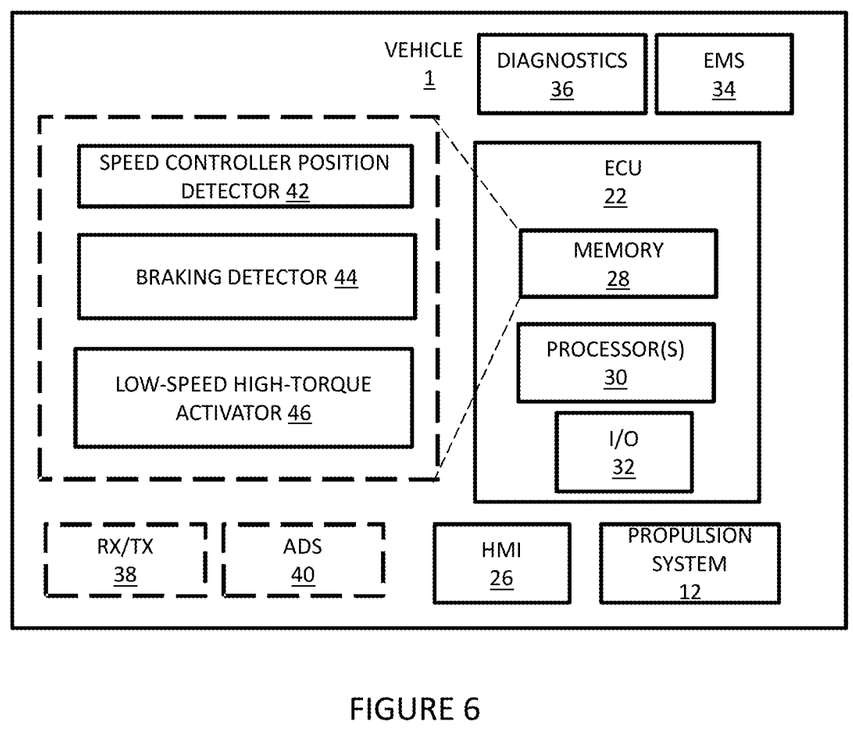
FIG. 6 is a block diagram showing system components of a vehicle according to some embodiments of the disclosed technology.

FIG. 6 is a block diagram showing system components of a vehicle 1 according to some embodiments of the disclosed technology.

In FIG. 6, the vehicle 1 comprises an ECU 22 which may be implemented at least in part in circuitry which includes a memory component 28, one or more processor(s) or processing circuitry 30, and one or more data interfaces, shown as input/output interface, I/O, 32 via which the ECU is able to communicated and control other components of the vehicle 1. As shown in FIG. 5, the other components of vehicle 1 include at least the vehicle's propulsion system 12, for example, the propulsion system 12 shown in FIG. 4, a human-machine interface 26, a EMS 34 a diagnostics system 36. In some embodiments, but not necessarily in all embodiments, the vehicle may also be equipped with a transceiver for sending and receiving data wirelessly, for example, over a Wi-Fi network shown as RX/fTX 38, and in some embodiments, the vehicle may further be provided with an automated or advanced driving system, ADS, 40 which may automate certain operations the vehicle performs so it can drive in an autonomous or semi-autonomous manner or allow remote operation of the vehicle.

Also shown in FIG. 6 are code components or modules of a computer program which, when loaded from memory 34 by one or more of the processor(s) or processing circuitry 30, cause the vehicle to implement an embodiment of the method 100 shown schematically in FIG. 3. As shown in FIG. 6, the computer program code comprises code for detecting the speed controller's position, indicated as speed controller position detector 42, code for detecting braking, shown as braking detector 44, and code for activating a low-speed high-torque mode of braking the vehicle, shown in FIG. 6 as low-speed high-torque activator 46.

In some embodiments, the vehicle 1 is a heavy-duty vehicle configured to operate in at least one low speed, high torque mode and at least one higher speed, lower torque mode, and the computer-program code is configured so that when loaded from memory 28 and executed by the one or more processors 30 of an ECU 22 of the vehicle 1, the vehicle 1 is caused to perform a method of automatically activating a high-torque braking system. Comprising determining a speed-controller of the vehicle is in a first position which results in the vehicle travelling in a higher-speed, lower-torque mode, for example, using the speed controller position detector 42 shown in FIG. 6, and, responsive to detecting braking, for example, using the braking detector 44, and detecting a change in position of the speed-controller from the first position to a second, neutral, position, for example, using the speed controller position detector 42, activating a low-speed high torque mode of operation for braking the vehicle, for example, using the low-speed high-torque activator 46.

In some embodiments of a vehicle according to the disclosed technology, the control system or ECU 22 of the vehicle is configured to automatically activate a high-torque braking system in a heavy-duty vehicle configured to operate in at least one low speed, high torque mode and at least one higher speed, lower torque mode. For example, the control system, ECU, 22 may comprise memory 28 and one or more processors 30 which may be shared with other system components of the vehicle in some embodiments or which may be dedicated resources for the ECU 22 to use in some embodiments The ECU 22 memory 28 stores computer program code which when loaded from the memory and executed by the one or more processors 30 provides a speed-controller position detector 42 configured to detect a position of a speed-controller of the vehicle, any changes in position of the speed-controller, and if the vehicle is operating in a high-speed low torque mode of propulsion. Computer program code is also stored in memory 28 which, when loaded and executed by processor(s) or processing circuitry 30 of the ECU 22 provides a braking detector 44 configured to detect braking of the vehicle 1. The memory 28 also stores computer code which when loaded from memory 28 and executed by the one or more processors or processing circuitry 30 of the ECU 22 provides a low-speed high-torque activator 46 which is configured to activating a low-speed high torque mode of propulsion for assisting braking of the vehicle responsive to the controller determining the propulsion system of the vehicle is operating in a high-speed, low-torque mode and the speed-controller position detector detecting a change in position of the speed-controller from the first position to a neutral position.

In some embodiments, the control system or ECU 22 comprises computer-program code which, when loaded from memory and executed by the one or more processors, configures a speed-controller position detector 42, the braking detector 44, and the low-speed high-torque activator 46 to cause the control system or ECU 22 to implement a method according to any of the embodiments disclosed herein.

In some embodiments, the vehicle or machine 1 comprises a heavy-duty vehicle including a control unit configured to automatically activate a high-torque braking system in a heavy-duty vehicle configured to operate in at least one low speed, high torque mode and at least one higher speed, lower torque mode, such as an embodiment of the control system or ECU describe above, where the control system or ECU 22 comprises memory 28, one or more processors or processing circuitry 30, and a speed-controller position detector 42 configured to detect a position of a speed-controller of the vehicle, any changes in position of the speed-controller, and if the vehicle is operating in a high-speed low torque mode of propulsion, a braking detector 44 configured to detect braking of the vehicle, and a low-speed high-torque propulsion mode activator 46 configured to activating a low-speed high torque mode of propulsion for assisting braking of the vehicle responsive to the controller determining the propulsion system of the vehicle is operating in a high-speed, low-torque mode and the speed-controller position detector detecting a change in position of the speed-controller from the first position to a neutral position.

In some embodiments of the heavy duty vehicle the control system comprises computer-program code which, when loaded from memory and executed by the one or more processors, configures the speed-controller position detector, the braking detector, and the low-speed high-torque activator to cause the control system to implement a method according to any of the disclosed method embodiments, for example, method 100 as shown in FIG. 3.

As mentioned above, in some embodiments, the vehicle may be a heavy-duty vehicle. A heavy-duty vehicle may comprise a wide range of different physical devices, such as combustion engines, electric machines, friction brakes, regenerative brakes, shock absorbers, air bellows, and power steering pumps. These physical devices are commonly known as Motion Support Devices (MSD). The MSDs may be individually controllable, for instance such that friction brakes may be applied at one wheel, i.e., a negative torque, while another wheel on the vehicle, perhaps even on the same wheel axle, is simultaneously used to generate a positive torque by means of an electric machine. The autonomous operation of a heavy-duty vehicle is accordingly more complex than the autonomous operation of a more light-weight vehicle such as a car. The heavy duty vehicle may be manually driven and operated in some embodiments, however, it is also possible to implement the disclosed braking method in a vehicle which is semi-autonomously operated and/or which is remotely operated, for example, a speed controller may be located remotely and operated at that location by an operator, and the control signals sent wirelessly to the vehicle.

Some, if not all, of the above embodiments may be implemented using computer program code which may be provided as software or hardcoded, for example, as a computer program product configured to be used by a device mounted on or integrated in a vehicle. In some embodiments, the computer program product comprises computer-code which when executed by one or more processors of the vehicle, causes the vehicle to implement a method according to any one of the disclosed method embodiments.

For example, the methods described above may be at least partly implemented through one or more processors, such as, the processors or processing circuitry 30 in the control unit 22 depicted in FIG. 6, together with computer program code for performing the functions and actions of the embodiments herein. The program code mentioned above may also be provided as a computer program product, for instance in the form of a data carrier carrying computer program code or code means for performing the embodiments herein when being loaded into the processor (s0 or processing circuitry in the control unit. The data carrier, or computer readable medium, may be one of an electronic signal, optical signal, radio signal or computer-readable storage medium. The computer program code may e.g. be provided as pure program code in the control unit or on a server and downloaded to the control unit. Thus, it should be noted that the functions of the control unit may in some embodiments be implemented as computer programs stored in memory 28 for example, a computer readable storage unit, for execution by processors or processing modules, e.g. the processing circuitry 30 in the control unit 22 of FIG. 6.

Those skilled in the art will also appreciate that the processing circuitry 30 and the memory or computer readable storage unit described above may refer to a combination of analog and digital circuits, and/or one or more processors configured with software and/or firmware, e.g. stored in a memory, that when executed by the one or more processors such as the processing circuitry perform a method according to any of the method embodiments as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The operating system of the vehicle may further various software components and/or drivers for controlling and managing general system tasks (e.g., memory management, storage device control, power management, etc.) and facilitates communication between various hardware and software components.

Where the disclosed technology is described with reference to drawings in the form of block diagrams and/or flowcharts, it is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

The description of the example embodiments provided herein have been presented for the purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements, features, functions, or steps than those listed and the words "a" or "an" preceding an element do not exclude the presence of a plurality of such elements, features, functions, or steps. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of methods, and may refer to elements, functions, steps or processes, one or more or all of which may be implemented in one aspect by a computer program product, embodied in a computer-readable medium, including computer-executable instructions, such as program code, executed by computers in networked environments.

A computer-readable medium may include removable and non-removable storage devices including, but not limited to, Read Only Memory (ROM), Random Access Memory, RAM), which may be static RAM, SRAM, or dynamic RAM, DRAM. ROM may be programmable ROM, PROM, or EPROM, erasable programmable ROM, or electrically erasable programmable ROM, EEPROM. Suitable storage components for memory may be integrated as chips into a printed circuit board or other substrate connected with one or more processors or processing modules, or provided as removable components, for example, by flash memory (also known as USB sticks), compact discs (CDs), digital versatile discs (DVD), and any other suitable forms of memory. Unless not suitable for the application at hand, memory may also be distributed over a various forms of memory and storage components, and may be provided remotely on a server or servers, such as may be provided by a cloud-based storage solution. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The memory used by any apparatus whatever its form of electronic apparatus described herein accordingly comprise any suitable device readable and/or writeable medium, examples of which include, but are not limited to: any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry. Memory may store any suitable instructions, data or information, including a computer program, software, an application including one or more of logic, rules, code, tables, etc. and/or other instructions capable of being executed by processing circuitry and, utilized by the apparatus in whatever form of electronic apparatus. Memory may be used to store any calculations made by processing circuitry and/or any data received via a user or communications or other type of data interface. In some embodiments, processing circuitry and memory are integrated. Memory may be also dispersed amongst one or more system or apparatus components. For example, memory may comprises a plurality of different memory modules, including modules located on other network nodes in some embodiments.

In the drawings and specification, there have been disclosed exemplary aspects of the disclosure. However, many variations and modifications can be made to these aspects which fall within the scope of the accompanying claims. Thus, the disclosure should be regarded as illustrative rather than restrictive in terms of supporting the claim scope which is not to be limited to the particular examples of the aspects and embodiments described above. The invention which is exemplified herein by the various aspects and embodiments described above has a scope which is defined by the following claims.

The invention claimed is:

1. A method of automatically activating a high-torque braking system in a vehicle configured to operate in at least one low speed, high torque propulsion mode and at least one higher speed, lower torque propulsion mode, the method comprising:

determining a speed-controller lever of the vehicle is in a first position which results in the vehicle travelling in a higher-speed, lower-torque propulsion mode; and, responsive to detecting braking and a change in position of the speed-controller lever from the first position to a second, neutral, position, activating a low-speed high torque propulsion mode to enhance braking of the vehicle.

2. The method of claim 1, wherein the speed-controller lever is a joystick or FSR lever.

3. The method of claim 1, the speed-controller lever is a joystick or FSR lever and wherein the inputs from the speed-controller lever control the propulsion system of the vehicle to activate the high-torque braking propulsion mode depending on one or more high-torque braking conditions being met.

4. The method of claim 1, wherein the change in position of the speed controller lever comprises:

moving the speed-controller lever from the first position, wherein the first position comprises a full forward position, to the second position, wherein the second position is obtained by moving the speed-controller lever back into the neutral position.

5. The method of claim 1, wherein the vehicle beings to brake in the high-speed low torque propulsion mode and dynamically shifts to the low-speed high-torque propulsion mode during braking responsive to the change in position of the speed-controller lever from forward in the first position into neutral in the second position.

6. The method of claim 1, wherein the vehicle comprises an electronic control unit, ECU, which is configured, responsive to the detected movement of the speed-controller, to cause a 2-speed solenoid of a propulsion system of the vehicle to change the torque mode of the propulsion system of the vehicle from the high speed low torque propulsion mode to the low-speed high torque propulsion mode to brake the vehicle without requiring an operator to manually switch the vehicle from the high-speed low torque propulsion mode to the low-speed high-torque propulsion mode.

7. The method of claim 1, wherein a time-delay is provided between detecting the movement triggering the high-torque braking and causing the propulsion system to operating in the high-torque braking propulsion mode.

8. A control system configured to automatically activate a high-torque braking system in a heavy-duty vehicle configured to operate in at least one low speed, high torque mode and at least one higher speed, lower torque mode, wherein the control system comprises:

memory;

one or more processors; and a speed-controller lever position detector configured to detect a position of a speed-controller lever of the vehicle, any changes in position of the speed-controller lever, and if the vehicle is operating in a high-speed low torque mode of propulsion;

a braking detector configured to detect braking of the vehicle; and a low-speed high-torque activator configured to activating a low-speed high torque mode of propulsion for assisting braking of the vehicle responsive to the controller determining the propulsion system of the vehicle is operating in a high-speed, low-torque mode and the speed-controller position detector detecting a change in position of the speed-controller lever from the first position to a neutral position.

9. The control system of claim 8, wherein the system comprises computer-program code which, when loaded from memory and executed by the one or more processors, configures the speed-controller lever position detector, the braking detector, and the low-speed high-torque activator to cause the control system to implement a method of automatically activating a high-torque braking system in a vehicle configured to operate in at least one low speed, high torque propulsion mode and at least one higher speed, lower torque propulsion mode, the method comprising:

determining a speed-controller lever of the vehicle is in a first position which results in the vehicle travelling in a higher-speed, lower-torque propulsion mode; and, responsive to detecting braking and a change in position of the speed-controller lever from the first position to a second, neutral, position, activating a low-speed high torque propulsion mode to enhance braking of the vehicle.

10. The control system of claim 8, wherein the system comprises computer-program code which, when loaded from memory and executed by the one or more processors, configures the speed-controller lever position detector, the braking detector, and the low-speed high-torque activator to cause the control system to implement a method of automatically activating a high-torque braking system in a vehicle configured to operate in at least one low speed, high torque propulsion mode and at least one higher speed, lower torque propulsion mode, the method comprising:

determining a speed-controller lever of the vehicle is in a first position which results in the vehicle travelling in a higher-speed, lower-torque propulsion mode; and, responsive to detecting braking and a change in position of the speed-controller lever from the first position to a second, neutral, position, activating a low-speed high torque propulsion mode to enhance braking of the vehicle, wherein the speed-controller lever is a joystick or FSR lever.

11. The control system of claim 8, wherein the system comprises computer-program code which, when loaded from memory and executed by the one or more processors, configures the speed-controller lever position detector, the braking detector, and the low-speed high-torque activator to cause the control system to implement a method of automatically activating a high-torque braking system in a vehicle configured to operate in at least one low speed, high torque propulsion mode and at least one higher speed, lower torque propulsion mode, the method comprising:

determining a speed-controller lever of the vehicle is in a first position which results in the vehicle travelling in a higher-speed, lower-torque propulsion mode; and responsive to detecting braking and a change in position of the speed-controller lever from the first position to a second, neutral, position, activating a low-speed high torque propulsion mode to enhance braking of the vehicle, wherein the speed-controller lever is a joystick or FSR lever and wherein the inputs from the speed-controller lever control the propulsion system of the vehicle to activate the high-torque braking propulsion mode depending on one or more high-torque braking conditions being met.

12. The control system of claim 8, wherein the system comprises computer-program code which, when loaded from memory and executed by the one or more processors, configures the speed-controller lever position detector, the braking detector, and the low-speed high-torque activator to cause the control system to implement a method of automatically activating a high-torque braking system in a vehicle configured to operate in at least one low speed, high torque propulsion mode and at least one higher speed, lower torque propulsion mode, the method comprising:
- determining a speed-controller lever of the vehicle is in a first position which results in the vehicle travelling in a higher-speed, lower-torque propulsion mode; and,
- responsive to detecting braking and a change in position of the speed-controller lever from the first position to a second, neutral, position, activating a low-speed high torque propulsion mode to enhance braking of the vehicle, wherein the change in position of the speed controller lever comprises:
  - moving the speed-controller lever from the first position, wherein the first position comprises a full forward position, to the second position, wherein the second position is obtained by moving the speed-controller lever back into the neutral position.

13. The control system of claim 8, wherein the system comprises computer-program code which, when loaded from memory and executed by the one or more processors, configures the speed-controller lever position detector, the braking detector, and the low-speed high-torque activator to cause the control system to implement a method of automatically activating a high-torque braking system in a vehicle configured to operate in at least one low speed, high torque propulsion mode and at least one higher speed, lower torque propulsion mode, the method comprising:
- determining a speed-controller lever of the vehicle is in a first position which results in the vehicle travelling in a higher-speed, lower-torque propulsion mode; and
- responsive to detecting braking and a change in position of the speed-controller lever from the first position to a second, neutral, position, activating a low-speed high torque propulsion mode to enhance braking of the vehicle, wherein when the vehicle begins to brake in the high-speed low torque propulsion mode and dynamically shifts to the low-speed high-torque propulsion mode during braking responsive to the change in position of the speed-controller lever from forward in the first position into neutral in the second position.

14. The control system of claim 8, wherein the system comprises computer-program code which, when loaded from memory and executed by the one or more processors, configures the speed-controller lever position detector, the braking detector, and the low-speed high-torque activator to cause the control system to implement a method of automatically activating a high-torque braking system in a vehicle configured to operate in at least one low speed, high torque propulsion mode and at least one higher speed, lower torque propulsion mode, the method comprising:
- determining a speed-controller lever of the vehicle is in a first position which results in the vehicle travelling in a higher-speed, lower-torque propulsion mode; and
- responsive to detecting braking and a change in position of the speed-controller lever from the first position to a second, neutral, position, activating a low-speed high torque propulsion mode to enhance braking of the vehicle, wherein the control system comprises an electronic control unit, ECU, which is configured, responsive to the detected movement of the speed-controller lever, to cause a 2-speed solenoid of a propulsion system of the vehicle to change the torque mode of the propulsion system of the vehicle from the high speed low torque propulsion mode to the low-speed high torque propulsion mode to brake the vehicle without requiring an operator to manually switch the vehicle from the high-speed low torque propulsion mode to the low-speed high-torque propulsion mode.

15. The control system of claim 8, wherein the system comprises computer-program code which, when loaded from memory and executed by the one or more processors, configures the speed-controller lever position detector, the braking detector, and the low-speed high-torque activator to cause the control system to implement a method of automatically activating a high-torque braking system in a vehicle configured to operate in at least one low speed, high torque propulsion mode and at least one higher speed, lower torque propulsion mode, the method comprising:
- determining a speed-controller lever of the vehicle is in a first position which results in the vehicle travelling in a higher-speed, lower-torque propulsion mode; and
- responsive to detecting braking and a change in position of the speed-controller lever from the first position to a second, neutral, position, activating a low-speed high torque propulsion mode to enhance braking of the vehicle, wherein a time-delay is provided between detecting the movement triggering the high-torque braking and causing the propulsion system to operating in the high-torque braking propulsion mode.

16. A heavy-duty vehicle comprising a control system configured to automatically activate a high-torque braking system in a heavy-duty vehicle configured to operate in at least one low speed, high torque mode and at least one higher speed, lower torque mode, wherein the control system comprises:
- memory;
- one or more processors; and
- a speed-controller position detector configured to detect a position of a speed-controller of the vehicle, any changes in position of the speed-controller, and if the vehicle is operating in a high-speed low torque mode of propulsion;
- a braking detector configured to detect braking of the vehicle; and
- a low-speed high-torque activator configured to activating a low-speed high torque mode of propulsion for assisting braking of the vehicle responsive to the controller determining the propulsion system of the vehicle is operating in a high-speed, low-torque mode and the speed-controller position detector detecting a change in position of the speed-controller from the first position to a neutral position.

17. The heavy duty vehicle according to claim 16, wherein the control system comprises computer-program code which, when loaded from memory and executed by the one or more processors, configures the speed-controller lever position detector, the braking detector, and the low-speed high-torque activator to cause the control system to implement a method of automatically activating a high-torque braking system in a vehicle configured to operate in at least one low speed, high torque propulsion mode and at least one higher speed, lower torque propulsion mode, the method comprising:
- determining a speed-controller lever of the vehicle is in a first position which results in the vehicle travelling in a higher-speed, lower-torque propulsion mode; and,
- responsive to detecting braking and a change in position of the speed-controller lever from the first position to a second, neutral, position, activating a low-speed high torque propulsion mode to enhance braking of the vehicle.

18. The heavy-duty vehicle according to claim 16, wherein the heavy duty vehicle is capable of being operated semi-autonomously or remotely.

19. The heavy-duty vehicle according to claim 16, wherein the control system comprises computer-program code which, when loaded from memory and executed by the one or more processors, configures the speed-controller lever position detector, the braking detector, and the low-speed high-torque activator to cause the control system to implement a method of automatically activating a high-torque braking system in a vehicle configured to operate in at least one low speed, high torque propulsion mode and at least one higher speed, lower torque propulsion mode, the method comprising:
- determining a speed-controller lever of the vehicle is in a first position which results in the vehicle travelling in a higher-speed, lower-torque propulsion mode; and
- responsive to detecting braking and a change in position of the speed-controller lever from the first position to a second, neutral, position, activating a low-speed high torque propulsion mode to enhance braking of the vehicle, wherein when the vehicle begins to brake in the high-speed low torque propulsion mode and dynamically shifts to the low-speed high-torque propulsion mode during braking responsive to the change in position of the speed-controller lever from forward in the first position into neutral in the second position.

20. The heavy-duty vehicle according to claim 16, wherein the control system comprises computer-program code which, when loaded from memory and executed by the one or more processors, configures the speed-controller lever position detector, the braking detector, and the low-speed high-torque activator to cause the control system to implement a method of automatically activating a high-torque braking system in a vehicle configured to operate in at least one low speed, high torque propulsion mode and at least one higher speed, lower torque propulsion mode, the method comprising:
- determining a speed-controller lever of the vehicle is in a first position which results in the vehicle travelling in a higher-speed, lower-torque propulsion mode; and
- responsive to detecting braking and a change in position of the speed-controller lever from the first position to a second, neutral, position, activating a low-speed high torque propulsion mode to enhance braking of the vehicle, wherein the control system comprises an electronic control unit, ECU, which is configured, responsive to the detected movement of the speed-controller lever, to cause a 2-speed solenoid of a propulsion system of the vehicle to change the torque mode of the propulsion system of the vehicle from the high speed low torque propulsion mode to the low-speed high torque propulsion mode to brake the vehicle without requiring an operator to manually switch the vehicle from the high-speed low torque propulsion mode to the low-speed high-torque propulsion mode.

* * * * *